(No Model.)
G. V. DELUE.
AUTOMATIC GATE FOR ELEVATORS.
No. 274,887. Patented Mar. 27, 1883.
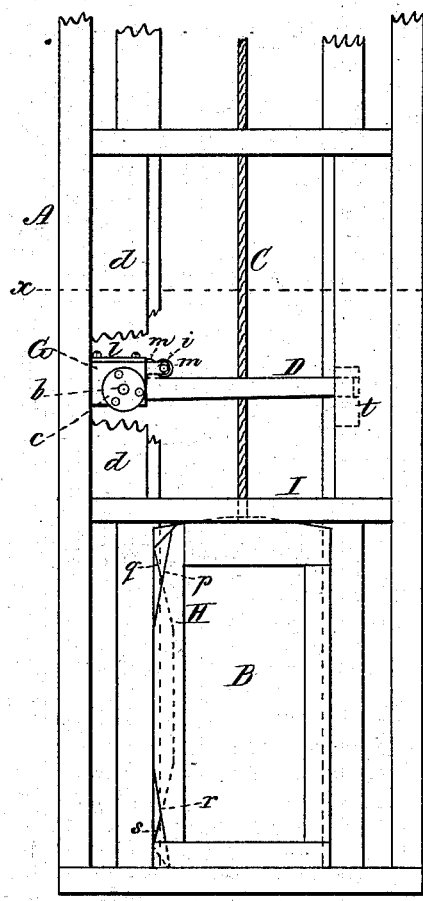
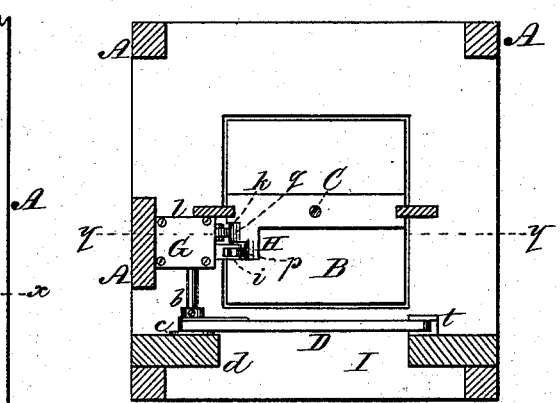
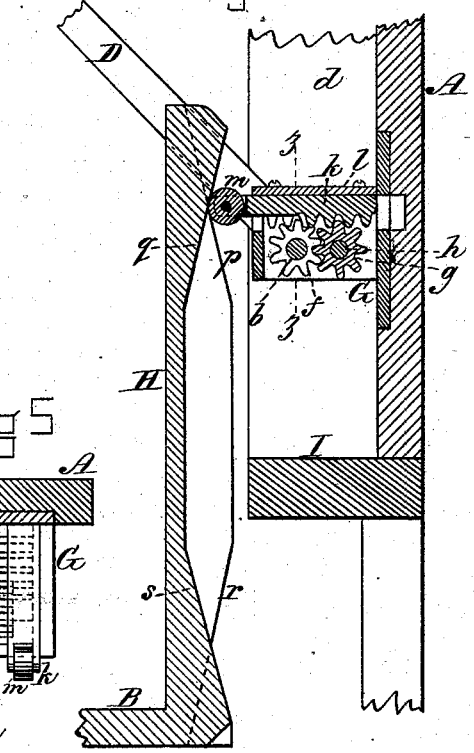
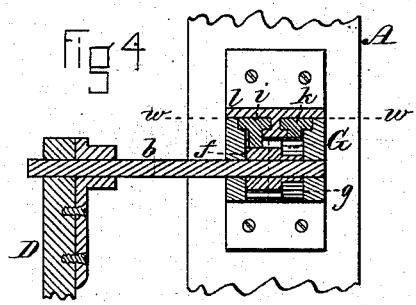
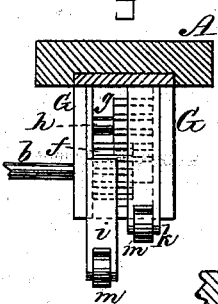
WITNESSES
W. J. Cambridge
Chas. E. Griffin
INVENTOR
George V. Delue
per H. C. Teschemacher
Atty

UNITED STATES PATENT OFFICE.

GEORGE V. DELUE, OF BOSTON, MASSACHUSETTS, ASSIGNOR OF ONE-FOURTH TO BERNARD A. MARKS, OF SAME PLACE.

AUTOMATIC GATE FOR ELEVATORS.

SPECIFICATION forming part of Letters Patent No. 274,887, dated March 27, 1883.

Application filed January 8, 1883. (No model.)

*To all whom it may concern:*

Be it known that I, GEORGE V. DELUE, a subject of the Queen of Great Britain, residing at Boston, in the county of Suffolk and State of Massachusetts, have invented certain Improvements in Automatic Gates for Elevators, of which the following is full, clear, and exact description, reference being had to the accompanying drawings, making part of this specification, in which—

Figure 1 is a front elevation of my automatic gate and its operative mechanism applied to an elevator-well and its car, a portion of one of the uprights being broken away to show the parts beyond. Fig. 2 is a horizontal section on the line $x\,x$ of Fig. 1. Fig. 3 is an enlarged vertical section on the line $y\,y$ of Fig. 2, with the parts in a different position. Fig. 4 is a section through a portion of the mechanism on the line $z\,z$ of Fig. 3. Fig. 5 is a horizontal section on the line $w\,w$ of Fig. 4.

My present invention relates to an improvement on the automatic gate for elevators, for which Letters Patent of the United States were granted to me September 26, 1882, No. 265,220, and has for its object to enable me to operate the gate much more slowly, and thus avoid the liability of accident incident to the rapid movement of the gate, as operated by the mechanism described and shown in my aforesaid Letters Patent. In this mechanism, which was necessarily made compact, owing to the limited space afforded for its reception, the gears were of small diameter, and consequently, when operated by the racks or projections on the elevator-car, a very slight movement of the latter would raise or lower the gate, causing it to move so suddenly and quickly that persons standing near it or leaning thereon were liable to be struck or injured thereby. By employing gears of large diameter this objection could be overcome; but such gears would render the mechanism clumsy and expensive and cause it to occupy more space than could be conveniently afforded for the purpose.

My present invention consists in a novel construction and arrangement of mechanism whereby the gate is operated slowly, as desired, as hereinafter more fully set forth.

In the said drawings, A A represent the walls of an elevator-well, and B the elevator-car, operated in the usual manner by means of the hoisting-rope C. At each floor the opening or entrance to the elevator-well is protected by a gate, D, composed of a single bar, one end of which is firmly secured to a horizontal shaft, $b$, one end of which is supported in a bearing in a plate, $c$, on the inner side of the upright $d$, the opposite end of this shaft $b$ extending into and having its bearings in a box or casing, G, secured to the wall A of the elevator-well.

To the shaft $b$, within the casing G, is secured a gear, $f$, which engages with a similar gear, $g$, on a short shaft, $h$, also having its bearings in the sides of the casing G, these two gears being arranged in different vertical planes, so as to slightly overlap each other, which causes their teeth to engage with each other only near the edges of the wheels, and not along their entire width, as seen in Fig. 5.

$i\,k$ are two horizontal rack-bars, which are placed immediately over and engage with the gears $f\,g$, these bars being arranged to slide in suitable grooves or ways formed between the upper edges of the casing G and its top plate or cover, $l$, as seen in Fig. 4, the relative positions of these rack-bars with respect to the gears being such that when one bar is forced in the other will be simultaneously pushed out, and thus when the bar $i$ is forced in the shaft $b$ will be rotated in one direction to raise the gate D and in the opposite direction to lower it when the bar $k$ is forced in. Each of these rack-bars $i\,k$ is preferably provided with a friction-roll, $m$, and they are alternately forced in and out by the elevator-car B in the following manner:

To the side of the car is secured a vertical piece, H, which is provided at the top with two oppositely-inclined faces, $p\,q$, and at the bottom with two oppositely-inclined faces, $r\,s$, the inclines $p\,r$ lying in the same vertical plane as the bar $i$ and the inclines $q\,s$ in the same vertical plane as the bar $k$, the inclines $p\,r$ acting on the friction-roll of the bar $i$ and the inclines $q\,s$ on the roll of the bar $k$, by which construction and arrangement, as the car B is raised, and just before it reaches the level of the floor I, the incline $p$, acting on the roll of the bar $i$, will force it in, and thus through the connections described cause the gate D to be slowly raised up out of the way, as seen in Fig. 3, the bar $k$ being at the same time forced out to its full extent, and should the car then descend without first going higher, the incline $q$, acting on the roll of the bar $k$, will at once force it in, and thus cause the gate to be lowered. If, however, the car goes farther upward, the incline $s$ at the bottom of the piece H will be brought into contact with the roll of the bar $k$ and will force it in, causing the shaft $b$ to be turned in the proper direction to lower the gate. On the descent of the car, just before it reaches the level of the floor I, the incline $r$ first acts upon the roll of the bar $i$ and pushes it in, which causes the gate to be raised, the gate being immediately lowered on the farther descent of the car below the floor by the incline $q$, which forces in the bar $k$ and causes the bar $i$ to be simultaneously forced out and left in a position to be acted upon by the incline $p$ on the next ascent of the car, and by thus employing two sliding rack-bars, $i\ k$, actuated by inclines on the elevator-car and arranged in different vertical planes, each bar adapted to operate one only of a pair of gears engaging with each other, the gate D is operated automatically in a perfectly certain and reliable manner, so as to open just before the car reaches the level of the floor and shut down immediately or soon after the car leaves it, whether the car is going up or down, and in this manner a perfect protection is afforded against accidents, which are liable to occur where a chain or bar is used which requires to be operated by hand, and which, through neglect or carelessness, is often forgotten, and the entrance to the elevator-well thus left unguarded.

The angle of the inclines $p\ q\ r\ s$ on the elevator-car may be varied according to the speed at which the car is run, in order to operate the gate more or less slowly, and as the time occupied in opening or closing the gate equals the time which the roll of one of the rack-bars remains in contact with one of the inclines, it is evident that a very slow movement of the gate can be secured, and the sudden jerks and dangerously quick movements of the gate incident to the construction described in my aforesaid patent of September 26, 1882, thus entirely avoided.

The above-described automatic mechanism has very few parts, and is strong, simple, and durable, not liable to get out of order, and is at all times perfectly certain and reliable in its action—advantages which recommend it for use wherever elevators are employed, especially those used for carrying merchandise.

The gears $f\ g$, with their rack-bars and casing G, are very compact, and can be readily set into the wall of the elevator-well out of the way, and at the same time are in a position easily accessible for repairs.

Instead of the gate being composed of a single bar, as shown, it may be formed of bars and slats adapted to shut together, or it may be of any other suitable construction which will admit of it being secured to and operated by the shaft $b$, the gate being preferably made to drop into a catch or socket, $t$, which stiffens it and holds it firmly against any inward pressure.

What I claim as my invention, and desire to secure by Letters Patent, is—

1. In an automatic gate for elevators, the gears $f\ g$, arranged in different vertical planes within a support or casing, and adapted to engage with each other along a portion only of the width of their teeth, in combination with the gate D, secured to the shaft of one of the gears, and two sliding rack-bars, $i\ k$, arranged side by side to engage with and actuate the gears, and adapted to be alternately forced in and out by a series of inclines, $p\ q\ r\ s$, on the elevator-car to raise and lower the gate, all constructed to operate substantially in the manner and for the purpose set forth.

2. In an automatic gate for elevators, the combination, with the gate D and the shafts $b\ h$ and gears $f\ g$, the latter arranged in different vertical planes and adapted to engage with each other along a portion only of the width of their teeth, of the two sliding rack-bars $i\ k$, each engaging with one of the gears, and adapted to be alternately pushed in and forced out by a series of inclines on the elevator-car in such manner that when one rack-bar is forced in by one incline the other bar will be simultaneously forced out and left in position to be in turn forced in by another incline, substantially as described.

3. The combination, with the gate D, shafts $b\ h$, gears $f\ g$, and sliding rack-bars $i\ k$, engaging therewith, of the elevator-car B, provided with two pairs of oppositely-inclined faces $p\ q\ r\ s$, one pair above the other, and with the two inclines of a pair in different vertical planes to adapt them to operate the two rack-bars $i\ k$, substantially as described.

Witness my hand this 1st day of January, A. D. 1883.

GEORGE V. DELUE.

In presence of—
P. E. TESCHEMACHER,
W. J. CAMBRIDGE.